United States Patent Office

3,415,797
Patented Dec. 10, 1968

3,415,797
PROCESS FOR POLYMERIZATION OF VINYL MONOMERS
Giancarlo Borsini and Francesco Visani, Milan, and Guidobaldo Cevidalli, Seveso, Milan, Italy, assignors to Montecatini Edison S.p.A., Milan, Italy
No Drawing. Filed Dec. 1, 1965, Ser. No. 528,321
Claims priority, application Italy, Dec. 3, 1964, 25,998/64
12 Claims. (Cl. 260—92.8)

ABSTRACT OF THE DISCLOSURE

Low-temperature mass polymerization of vinyl chloride and monomer copolymerizable therewith which is carried out in the presence of a halogenated saturated hydrocarbon fluidifier (between 5 and 50% by weight of the monomer component) and 0.0001 to 0.5 part by weight (to 100 parts by weight of the monomer component) of butadiene, pentadiene, cyclopentadiene and like polyunsaturated hydrocarbons which limit the range distribution of the precipitating-polymer particle size, the reaction being carried out at −60° C. to +20° C.

---

Our present invention relates to the polymerization of vinyl monomers and, more particularly, to the polymerization of vinyl monomers (i.e., vinyl chloride and vinyl compounds copolymerizable therewith) in a medium consisting predominantly of the monomeric component by the so-called "mass" method.

The catalytic polymerization of vinyl chloride at relatively low temperatures (i.e., from about −60° C. to +20° C.) by the mass-polymerization method, whereby the polymerization medium is constituted predominantly by the monomeric component itself, has some significant disadvantages from the technological viewpoint as well as from the economic considerations involved. For example, the degree of conversion of the monomer to the polymer is limited by the fact that the polymerization reaction yields a thick paste or slurry and the homogeneity of the product decreases as the mass thickens. Thus with conventional systems it is impossible to keep the mass sufficiently fluid to insure a high degree of homogeneity and, at the same time, increase the degree of conversion inasmuch as increasing conversion results in decreasing ability to maintain the agitation upon which homogeneity depends. Moreover, as a practical consideration, it is necessary to maintain the most careful control of the temperature of the reaction since products formed at the lower temperatures are more desirable and have physical and chemical characteristics vastly superior to the polymers formed at room temperature or at still higher temperatures. This is of particular significance because the reaction is exothermic and, in the thickened condition of the reaction mass, removal of the reaction heat is most difficult. The disadvantages of low degrees of conversion of the monomer to the polymer are themselves sufficient to render the conventional mass-polymerization processes unsuitable for large-scale production. Thus it must be recognized that with a maximum degree of conversion of, say, 10%, the monomer must be reintroduced into the reaction vessel or the reaction zone ten times for complete conversion of a set quantity of the monomer to the polymer; by contrast, a conversion degree of 20% reduces the number of cycles required for complete conversion to 5. Even a small increase in the degree of conversion of the monomer to the polymer, while maintaining the advantageous physical and chemical properties of the latter, thus yields a significant reduction in the cost of production and an increase in the plant economy. Furthermore, an increase in the degree of conversion means an increase in the catalyst efficiency in terms of the quantity of polymer produced per unit weight of the polymerization catalyst. When polymerization is halted at a low degree of conversion, residual active catalyst is incompletely utilized. This is of special significance when it is noted that the recovery of the catalyst in an active state from the reaction mass is complex and problematical because of the ready alterability of the catalyst system.

It is, therefore, the principal object of the present invention to provide a process for the polymerization of vinyl monomers and particularly vinyl chloride which is free from the aforementioned disadvantages and is thus characterized by an improved yield without a disadvantageous alteration of the physical and chemical properties of the polymer obtained.

This object and others which will become apparent hereinafter are attained by a process according to the present invention which is based on the surprising discovery that mass polymerization of vinyl monomers and especially vinyl chloride alone or in the presence of minor quantities of vinyl monomers copolymerizable therewith can be carried out with high conversions in a reaction medium consisting predominantly of the vinyl monomer component itself in the manner of conventional mass-polymerization methods when the reaction medium contains minor amounts of organic unsaturated compounds constituting, in effect, a fluidifying component, these unsaturated compounds preferably being low-molecular weight olefinic and acetylenic compounds containing at least one unsaturated bond and preferably a plurality thereof. Of particular advantage for the purposes of the present invention are hydrocarbons of this class containing four and five carbon atoms and having preferably conjugated unsaturated bonds. Thus compounds such as the butadienes, pentadienes and cyclopentadienes, alkyl derivatives and/or aryl-substituted dienes and halogen-substituted dienes have been found to be highly effective for the purposes of the present invention as have compounds having at least one olefinic bond and at least one acetylenic bond. Suitable compounds of the latter class include monovinyl acetylene and compounds with similar skeletons. While best results are obtained with compounds whose molecules contain only four or five carbon atoms, it may be noted that the operable class includes also higher molecular weight compounds in which the basic unsaturated chain has plural unsaturated bonds and four or five carbon atoms. We have discovered that the most effective results are obtained when these unsaturated hydrocarbons are used in amounts ranging between 0.0001 and 0.5 part by weight per 100 parts by weight of the monomer and, within this range, between substantially 0.005 and 0.05 part by weight of the multiple-unsaturated hydrocarbons per 100 parts of the monomer, quantities within the latter range being of noticeably better effect.

It has been found, moreover, that the improvement of the present invention is compatible with other techniques for increasing the fluidity of the reaction mass. Thus, the relatively small quantities of unsaturated hydrocarbons mentioned above can be utilized in conjunction with the addition of relatively large quantities (e.g., between 5 and 50% by weight) of halogenated saturated hydrocarbons to the initial reaction mass. This system permits a sharp increase in the maximum conversion of the monomer to the polymer in low-temperature vinyl-chloride-polymerization. The resulting combination appears to have synergistic effect inasmuch as the simultaneous addition of small quantities of unsaturated hydrocarbons and of relatively large quantities of saturated halogen-substituted hydrocarbons produces a substantially higher degree of conversion than is possible with either the unsaturated hydrocarbons or the halogen-substituted hydrocarbons alone and even greater than the additive results which might be supposed upon such combination.

A process whereby addition of large quantities of the fluidifying halogenated saturated hydrocarbons to the reaction mass increases the polymerization degree is described in the commonly assigned copending application Ser. No. 411,588, filed Nov. 16, 1964, and entitled, "Process for Producing Vinylic Polymers." Thus, any of the halogenated hydrocarbons indicated to be effective as fluidifying compounds in this copending application can be used for the same purpose in the reaction system of the present invention wherein, however, they are employed in conjunction with the aforementioned minor proportion of unsaturated and preferably polyunsaturated low-molecular-weight hydrocarbons to produce the indicated synergism.

It has been found that the process of the present invention as described above is surprisingly effective in its ability, although relatively minor amounts of the unsaturated additive are used, to prolong the fluid state of the reaction mass over the course of the reaction thereby permitting exceptionally high degrees of conversion to be obtained. The adjuvants do not, however, disadvantageously modify the physical and mechanical properties of the polymer, which can be formed at relatively low temperatures since it is not necessary to use elevated temperature to maintain the fluidity of the reaction mass.

The polymers which are obtained in the case of vinyl chloride, for example, can be made into films, fibers and molded bodies by conventional processes and with physical properties at least equal to those of similar-temperature polymerizations conventionally carried out at much smaller degrees of conversion. It will also be noted that it is a significant feature of this invention that not only the conversion degree is increased but also the proportion of solids (polymer) in the reaction medium can be raised to a much higher level than has been possible heretofore, thereby obtaining much better utilization of the reactor and polymer recovery systems.

The invention is applicable to monomeric systems consisting entirely of vinyl chloride as well as to monomeric systems consisting in major part of vinyl chloride together with minor parts of vinylic compounds copolymerizable therewith. Typical copolymerizables with vinyl chloride include vinylidene chloride and vinyl acetate.

Still another considerable advantage of the present invention lies in the fact that, although the addition of small quantities of unsaturated hydrocarbons to the monomer to be polymerized may cause a slight diminution of the polymerization rate, this drawback is largely compensated by the fact that, with respect to the attainable high degree of conversion, the consumption of the catalytic system per unit weight of polymer produced is significantly decreased with respect to polymerization carried out in the absence of such unsaturated hydrocarbons. Moreover, in spite of the slight diminution of the polymerization rate, the molecular weight of the resulting polymers does not appreciably increase and remains at values useful and necessary to an advantageous utilization of the polymer for films and molded bodies of valuable properties.

Still a further advantage of the polymerization process connected with the present invention resides in that the polymerization of vinyl chloride can be carried out even though the monomer is impure by virtue of the presence of unsaturated hydrocarbons (for example butadiene), able to act as fluidifiers in the polymerization step as previously described. As such impurities can be removed from vinyl-chloride monomers only by long and complex separation techniques, the advantage of the process according to the present invention will be very evident.

The effect of the fluidity of the reaction mass, resulting from the use of small quantities of unsaturated compounds, is related both to the average size of the polymer particles which are formed during the polymerization and to the percentile size distribution in terms of numbers of particles; the sizes of the particles can be determined by the microscopic observation of the polymer in the dry state and, by observing the sizes of a great number of particles, it is possible to determine the distribution among the various sizes.

By observing the samples drawn at different polymerization times and therefore at different conversion degrees (and of the fluidity of the reaction mass) it is also possible to determine the variation of said distribution of the sizes during the polymerization procedure. The distribution values of the particle sizes have been studied for bulk polymerization (absence of fluidifiers) at low temperature of the pure vinyl chloride as well as of vinyl chloride with the addition of relatively high quantities (from 5 to 50%) of halogenated saturated hydrocarbons and compared with the distribution resulting from the addition of small quantities of unsaturated compounds to the reaction system. From this comparison, it can be observed that the size distribution of particles varies during the polymerization processes in the absence of the unsaturated compounds, with the average size of particles tending to increase (probably owing to aggregation phenomena). In this case the final product (i.e., the polymer separated upon thickening of the reaction mass) is constituted of particles with sizes in the range of from 1 to more than 100 microns and predominantly between 20 and 60 microns.

In the presence of small quantities of unsaturated hydrocarbons the distribution of the size of particles, which at the beginning of the reaction is of rather limited range, remains unchanged even as the polymerization proceeds to the thickening stage, so that the largest sizes of the final product do not exceed 60 to 70 microns, while the greater part of the particles is in the range of from 1 to 30–40 microns.

We have thus found that by keeping, even at relatively high conversions, the average sizes of particles or of aggregates of particles at low and substantially invariable values over the course of polymerization, it is possible to obtain a mass with a high fluidity. According to a non-limitative theory of the present invention, the fact that the average size of the particles is relatively low, that is they do not gather in large aggregates, gives rise to a decrease in the swelling of the polymer in the monomer since the monomer fraction (which would likely be absorbed by an agglomerated polymer) is rendered available even at high conversions to ensure the continued fluidity of the reaction mass. The effect of unsaturated compounds added in the polymerization mass of vinyl chloride on the fluidity of the reaction mass can therefore be explained as an influence upon the reaction tending to maintain the constancy of the particle size and a low value therefor.

As previously noted, the best results have been obtained by using hydrocarbon compounds containing more than one unsaturated bond. Particularly desirable for the purposes of the present invention are the hydrocarbons containing two conjugated double bonds, such as, for example, compounds with 4 and 5 carbon atoms. The following have been most effective: butadiene 1-3, pentadiene 1-3, cyclopentadiene 1-3, or their alkyl derivatives and/or aryl substitution products, e.g., isoprene, or their halogen-substituted derivatives, e.g., chloroprene (2-chlorobutadiene), and like compounds. Another class of unsaturated compounds which can be advantageously employed in the process of the present invention consists of the hydrocarbons having both ethylenic and acetylenic bonds, such as, for example, monovinylacetylene and compounds of like configuration. These unsaturated hydrocarbons are employed in quantities ranging from 0.0001 to 0.5 part by weight with respect to 100 parts of the monomer. Optimum results are obtained by using such unsaturated hydrocarbons in quantities ranging from 0.005 to 0.05 part by weight with respect to 100 parts by weight of the monomer. The addition of such unsaturated hydrocarbons can be carried out in various ways. For instance, the unsaturated hydrocarbon can be entirely added at the beginning of the polymerization or it can be continuously added during the period of polymerization.

The process is carried out preferably at low temperatures, generally in the temperature range from $+20°$ C. to $-60°$ C. According to a preferred embodiment of the process according to the present invention, the monomeric component (vinyl chloride or a mixture thereof with a vinylic compound copolymerizable therewith) is fed into the polymerization reactor; subsequently, after a careful flushing of the reactor with nitrogen, a relatively large quantity (by comparison with the unsaturated hydrocarbon) with respect to the monomer of a halogenated derivative of saturated hydrocarbon (e.g., ethylchloride) able to act as fluidifier for the reaction mass is supplied. Then the unsaturated hydrocarbon in very small quantities (by comparison with the saturated hydrocarbon haloderivative) and finally the catalytic system are added. The mass is then subjected to polymerization at low temperature (preferably about $-40°$ C.) with the reaction mass being maintained sufficiently fluid. In this manner it is possible to reach relatively high conversion degrees which can attain and sometimes exceed 30%.

In order to illustrate the present invention, the following examples are provided to show the best mode known to us for practising the invention.

EXAMPLE I 12 kg. of monomeric vinyl chloride were fed at $-40°$ C. into a stainless-steel autoclave (about 16 liters capacity), provided with a propeller-type stirrer with high speed and maintaining, in conditions of fluidity, a suitable agitation of the reaction mass.

After a careful flushing of the vessel with nitrogen, 20.4 g. of triethyl boron and 13.2 g. of ethyl ether (catalyst components) and 1000 cc. of oxygen, this latter over a period for about 15 minutes, were charged into the autoclave in this order.

After about 4¼ hours from the oxygen introduction, about 1300 g. of polymer with a conversion degree of 10.85% was separated from a rather thickened reaction mass. The catalyst consumption (expressed as triethyl boron) was 15.7 g. for each kg. of polymer produced.

EXAMPLE II

In the following order, 12 kg. of monomeric vinyl chloride, 20.4 g. of triethyl boron and 19.2 g. of cumene hydroperoxide (8.65% active oxygen) were introduced into the autoclave described in the preceding example.

After 3¾ hours from the addition of cumene hydroperoxide, 1450 g. of polymer were obtained with a 12.1% conversion degree from the thickened reaction mass, the catalyst consumption (expressed in terms of triethyl boron) being 14 g./kg. of obtained polymer.

EXAMPLE III

In the following order, 12 kg. of vinyl chloride, 1.2 g. of butadiene (0.01% by weight with respect to the vinyl chloride), 24 g. of triethyl boron, 16.2 of ethyl ether and 2350 cc. of oxygen, this latter over a period of about 15 minutes, were introduced into the polymerization autoclave described in Example I.

After about 10 hours of polymerization at $-40°$ C., 2.5 kg. of polymer with a conversion degree of 20.9% and with a catalyst consumption (expressed in terms of triethyl boron) of 9.6 g./kg. of obtained polymer were recovered from a still relatively fluid polymerization mass.

EXAMPLE IV

In the following order, 12 kg. of vinyl chloride, 1.2 g. of butadiene (0.01% by weight with respect to the vinyl chloride) 24 g. of triethyl boron and 23 g. of cumene hydroperoxide (8.65% of active oxygen) were introduced into the polymerization autoclave described in Example I.

After 9 hours of polymerization at $-40°$ C., 2.65 kg. of polymer with a conversion of 22.2% and with a catalyst consumption (as triethyl boron) of 9.07 g./kg. of obtained polymer, were recovered from a reaction mass with the characteristics of incipient thickening.

EXAMPLE V

In the following order, 12 kg. of vinyl chloride, 0.96 g. of 2-chlorobutadiene (chloroprene) (0.008 by weight with respect to the vinyl chloride), 24 g. of triethyl boron, 16. 2 g. of ethyl ether and 2350 cc. of oxygen, the latter over a period of about 15 minutes were introduced into the polymerization autoclave described in Example I.

After about 11 hours of polymerization at $-40°$ C., 2.3 kg. of polymer with a conversion of 19.2% and with a catalyst consumption (as triethyl boron) of 10.45 g./kg. of obtained polymer, were recovered from a rather thickened reaction mass.

By comparing Examples I and II with Examples III, IV and V, it may be seen how small quantities of unsaturated hydrocarbons such as butadiene and their halogen derivatives, surprisingly act to increase the conversion degree and to lower the catalyst consumption per unit of polymer. The comparative particle-size distributions are shown in the attached table. Note that the polymerization mass thickened appreciably after only 4¼ hours in Example I and 3¾ hours in Example II, whereas polymerization was able to continue, prior to appreciable thickening, for 10 hours in Example III, 9 hours in Example IV and 11 hours in Example V.

EXAMPLE VI

In the following order, 10 kg. of vinyl chloride, 2.5 kg. of ethyl chloride (25% by weight with respect to the vinyl chloride) 20 g. of triethyl boron and 18.9 of cumene hydroperoxide (8.65% active oxygen) were introduced into the polymerization autoclave described in Example I and as set forth therein.

After about 12 hours of polymerization at $-40°$ C. 2.4 kg. of polymer with a conversion of 24% and with a catalyst consumption (as triethyl boron) of 8.35 g./kg. of polymer were recovered from a thick but still easy to handle reaction mass.

EXAMPLE VII

In the following order, 10 kg. of vinyl chloride, 2.5 g. of ethyl chloride (equal to 25% by weight with respect to the vinyl chloride component), 1.0 g. of butadiene (equal to 0.01% by weight with respect to the vinyl chloride), 20 g. of triethyl boron and 18.9 of cumene hydroperoxide (8.65% active oxygen) were introduced into the polymerization autoclave described in Example I and under the conditions set forth therein.

After about 17 hours of polymerization at $-40°$ C., 3.2 kg. of polymer, with a conversion of 32% and with a catalyst consumption (as triethyl boron) of about 6.5 g./kg. of polymer, were recovered from a relatively thickened reaction mass.

From a comparison between the conversions and the catalyst consumption of Examples VI and VII, the synergetic action of small quantities of butadiene (0.01% by weight with respect to the vinyl chloride) in combination with ethyl chloride is readily apparent. Thus, in the former which ran for only 12 hours, the catalyst consumption was 8.35 g./kg. of polymer while, in the latter which ran 41% longer, the catalyst consumption was about 22.6% less.

EXAMPLE VIII 12 kg. of monomeric vinyl chloride was introduced after a cooling to −20° C., into the steel autoclave described in Example I. In the following order, 16.2 g. of triethyl boron and 15.25 g. of cumene hydroperoxide having 8.65% of active oxygen were added, after a careful flushing of the atmosphere within the autoclave with nitrogen.

After 90 minutes of polymerization at −20° C., 1250 g. of polymer, with a conversion degree of 10.4% and with a catalyst consumption of 13 g. of triethyl boron per kg. of polymer, was separated from a rather thickened polymerization slurry.

EXAMPLE IX 12 kg. of vinyl chloride, 1.2 g. of butadiene (0.01% by weight with respect to the monomer), 16.2 g. of triethyl boron and 15.25 g. of cumene hydroperoxide (8.65% active oxygen) were charged into the autoclave described in Example I, with cooling at −20° C. and operation under the above-indicated conditions.

After 4 hours 30 minutes of polymerization at −20° C., 2.300 kg. of polymer with a conversion degree of 19.2% and with a consumption of 7 g. of triethyl boron per kg. of produced polymer, were recovered from a still relatively fluid polymerization slurry.

EXAMPLE X

In the following order, 12 kg. of vinyl chloride, 24 g. of triethyl boron and 23 g. of cumene hydroperoxide (8.65% active oxygen) were introduced, after cooling at −50° C., into the polymerization autoclave described in Example I and operating under the above-described conditions.

After 5 hours of polymerization at −50° C., 1380 g. of polymer with a conversion degree of 11.5%, were separated from the reaction mass. The triethyl boron consumption amounted to 17.5 g. per kg. of polymer.

EXAMPLE XI

In the following order, 12 kg. of vinyl chloride, 1.2 g. of butadiene, 27 g. of triethyl boron, 25.8 g. of cumene hydroperoxide (8.65% of active oxygen), were introduced into the polymerization autoclave described in Example I and under the same conditions.

After 11½ hours of polymerization, 2,600 g. of polymer with a conversion degree of 21.5% and with a consumption of 10.5 g. of triethyl boron per kg. of polymer were recovered from a still fluid slurry.

We claim:

1. In a process wherein vinyl chloride is subjected to mass polymerization at a temperature of about −60° C. to +20° C. in the presence of an alkyl-boron based vinyl-polymerization catalyst with the resulting polymer precipitating from the reaction mass, and wherein between substantially 5 and 50% by weight of a halogenated saturated hydrocarbon fluidifier for the monomeric component is combined therewith, the improvement which comprises the step of admixing with the reaction mass 0.0001 and 0.5 part by weight to 100 parts by weight of said monomeric component of at least one unsaturated low-molecular weight hydrocarbon selected from the group consisting of diolefinic and acetylenic hydrocarbons to maintain the fluidity of the reaction mass during polymerization while limiting the range distribution of the precipitating-polymer particle size.

2. The improvement defined in claim 1 wherein said unsaturated hydrocarbon is selected from the group consisting of butadiene 1-3, pentadiene 1-3, and cyclopentadiene 1-3.

3. The improvement defined in claim 1 wherein said unsaturated compound is present in an amount ranging between substantially 0.005 to 0.05 part by weight per 100 parts by weight of said monomeric component.

4. The improvement defined in claim 1 wherein said unsaturated compound has conjugated double bonds and has at least one hydrogen atom replaced with a substituent selected from the group which consists of alkyl, aryl and halogen.

5. The improvement defined in claim 4 wherein said unsaturated compound is isoprene.

6. The improvement defined in claim 4 wherein said unsaturated compound is chloroprene.

7. The improvement defined in claim 1 wherein a polymerization reactor is successively charged with said monomeric vinylic component, said chlorinated saturated hydrocarbon fluidifier, said unsaturated hydrocarbon, and a catalyst system capable of mass polymerization of said monomeric component, said reactor being flushed with nitrogen after introduction of said monomeric component and prior to the addition of said chlorinated hydrocarbon thereto.

8. The improvement defined in claim 7 wherein said reaction is carried out at a temperature of about −40° C., said unsaturated hydrocarbon being present in an amount ranging between substantially 0.005 to 0.05 part by weight per 100 parts by weight of the monomeric component, said monomeric component consisting predominantly of vinyl chloride.

9. The improvement defined in claim 8 wherein said unsaturated hydrocarbon is selected from the group which consists of butadienes, isoprene, chloroprene and monovinyl acetylene, said chlorinated saturated hydrocarbon consisting at least in major part of ethyl chloride.

10. In a process for the polymerization of vinyl chloride wherein the monomeric component is subjected to mass polymerization with the resulting polymer precipitating from the reaction mass, at a temperature substantially in the range of −60° to +20° C., in the presence of a polymerization catalyst based on a trialkyl boron, the improvement which comprises the step of admixing with the reaction mass a conjugated diene hydrocarbon, in an amount substantially in the range of 0.0001 to 0.5 part by weight per 100 parts by weight of monomeric component, to maintain high fluidity of the reaction mass during the polymerization, while limiting the range of the distribution of the precipitating polymer particle sizes.

TABLE.—PERCENTILE PARTICLE-SIZE DISTRIBUTION

| Polymerization | Polymerization time (hours) | Range in microns | | | | | | | | |
|---|---|---|---|---|---|---|---|---|---|---|
| | | 0–12 | 12–24 | 24–36 | 36–48 | 48–60 | 60–72 | 72–84 | 84–96 | 96–108 |
| No fluidifier (Example I) | 0.5 | 33 | 51 | 13 | 3 | | | | | |
| | 1 | 30 | 44 | 19 | 4 | 3 | | | | |
| | 2 | 30 | 29 | 23 | 11 | 4 | 3 | | | |
| | 3 | 11 | 17 | 20 | 22 | 10 | 5 | 5 | 4 | 3 |
| 100 parts of vinyl chloride +10 parts of EtCl (Example VI) | 1 | 28 | 49 | 13 | 8 | 2 | | | | |
| | 6 | 20 | 27 | 23 | 7 | 8 | 5 | 3 | 3 | 2 |
| | 10 | 7 | 35 | 18 | 20 | 7 | 3 | 3 | 2 | 2 |
| Vinyl chloride +100 p.p.m. of butadiene (Example III) | 1 | 39 | 53 | 5 | 2 | | | | | |
| | 2 | 16 | 70 | 10 | 4 | | | | | |
| | 6 | 4 | 76 | 14 | 6 | | | | | |
| | 8 | 2 | 68 | 20 | 8 | 3 | | | | |
| 100 parts of vinyl chloride +10 parts of ethyl chloride +100 p.p.m. of butadiene (Example VII) | 3 | 59 | 34 | 6 | 1 | | | | | |
| | 8 | 40 | 45 | 12 | 3 | | | | | |
| | 15 | 17 | 58 | 13 | 7 | 4 | | | | |

11. The improvement defined in claim 10 wherein said conjugated diene hydrocarbon is selected from the group consisting of butadiene 1-3, pentadiene 1-3, cyclopentadiene 1-3, isoprene, and chloroprene.

12. In a process for the mass polymerization of vinyl chloride with the resulting polymer precipitating from the reaction mass, at a temperature ranging from substantially −60° to +20° C. in the presence of a polymerization catalyst based on a trialkyl boron, wherein the polymerization is carried out in the presence of a halogenated saturated hydrocarbon in amounts substantially ranging from 5 to 50 parts by weight per 100 parts by weight of monomeric component, the improvement comprising the step of admixing with the reaction mass a diene hydrocarbon in an amount substantially ranging from 0.0001 to 0.5 part by weight per 100 parts by weight of monomeric component, to maintain high fluidity of the reaction mass during the polymerization while limiting the range of the distribution of the precipitating polymer particle sizes.

References Cited
UNITED STATES PATENTS

| | | | |
|---|---|---|---|
| 1,983,949 | 12/1934 | Semon | 260—2 |
| 2,327,705 | 8/1943 | Frolich et al. | 252—59 |
| 2,559,947 | 7/1951 | Crouch | 260—83.7 |
| 3,215,682 | 11/1965 | Farrar et al. | 260—94.3 |
| 3,303,156 | 2/1967 | Dauby et al. | 260—29.7 |
| 3,112,298 | 11/1963 | Welch. | |
| 3,169,947 | 2/1965 | Stroh. | |

JOSEPH L. SCHOFER, *Primary Examiner.*

J. C. HAIGHT, *Assistant Examiner.*

U.S. Cl. X.R.

260—87.5, 87.7, 91.5, 91.7